US011009131B2

(12) United States Patent
Turner et al.

(10) Patent No.: US 11,009,131 B2
(45) Date of Patent: May 18, 2021

(54) COMBUSTOR HAVING HONEYCOMB SEAL RING

(71) Applicant: DOOSAN HEAVY INDUSTRIES & CONSTRUCTION CO., LTD., Changwon-si (KR)

(72) Inventors: Glenn David Turner, Seabrook, TX (US); Matthew Charles Lau, Shoreacres, TX (US); Ryan Lee Nutt, Crosby, TX (US)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 401 days.

(21) Appl. No.: 16/131,031

(22) Filed: Sep. 14, 2018

(65) Prior Publication Data
US 2020/0088302 A1 Mar. 19, 2020

(51) Int. Cl.
*F16J 15/00* (2006.01)
*F16J 15/44* (2006.01)
*F02C 3/14* (2006.01)
*F23R 3/00* (2006.01)

(52) U.S. Cl.
CPC ............... *F16J 15/444* (2013.01); *F02C 3/14* (2013.01); *F23R 3/002* (2013.01); *F05D 2240/55* (2013.01); *F23R 2900/00012* (2013.01)

(58) Field of Classification Search
CPC ...................... F01D 9/023; F23R 3/002; F23R 2900/00012; F16J 15/444; F05D 2240/55
See application file for complete search history.

(56) References Cited

U.S. PATENT DOCUMENTS 6,546,627 B1 * 4/2003 Sekihara ................. B23P 6/005
29/402.08
2016/0153294 A1 * 6/2016 Graf ......................... F01D 9/04
415/208.2

FOREIGN PATENT DOCUMENTS

JP 2002-071136 A 3/2002
KR 10-2009-0089966 A 8/2009

OTHER PUBLICATIONS

A Korean Office Action dated Nov. 27, 2019 in connection with Korean Patent Application No. 10-2018-0122808 which corresponds to the above-referenced U.S. application.

* cited by examiner

*Primary Examiner* — Todd E Manahan
*Assistant Examiner* — Katheryn A Malatek
(74) *Attorney, Agent, or Firm* — Invenstone Patent, LLC

(57) ABSTRACT

Provided is a combustor of a gas turbine including a combustion liner where combustion occurs, a transition piece connected to the combustion liner to allow combustion gases to pass through, and a honeycomb seal ring disposed between the combustion liner and the transition piece to prevent compressed air from leaking through a gap between the combustion liner and the transition piece. The honeycomb seal ring is inserted into the exit portion of the combustion liner to prevent compressed air from leaking when the combustion liner and the transition piece are coupled with each other.

15 Claims, 8 Drawing Sheets

COMBUSTOR HAVING HONEYCOMB SEAL RING

TECHNICAL FIELD

Exemplary embodiments of the present invention relate to a combustor of a gas turbine, and more particularly, to a combustor of a gas turbine having a honey comb seal ring to inhibit combustion gas from leaking through a gap between the mating interface of a combustion liner and a transition piece.

BACKGROUND

A turbine is a mechanical device that obtains rotational force by impulsive force or reaction force by using a flow of compressible fluid, such as steam or gas, and includes a steam turbine using steam, a gas turbine using high-temperature combustion gas, or the like.

The gas turbine is a rotary power engine that extracts energy from the flow of the combustion gas. The gas turbine includes a compressor, a turbine, and a combustion chamber. The compressed air pressurized by the compressor is mixed with fuel and then the mixture is combusted, such that high-temperature high-pressure combustion gas expands, and the turbine is driven by this expansion force. Energy is transferred through a shaft as torque, or is obtained in the form of thrust or compressed air. This energy can be used to drive an aircraft, a generator, and so on.

The compressor is provided with an air inlet through which air is supplied to the compressor, and a plurality of compressor vanes and blades are disposed alternately in the compressor housing. The combustor supplies fuel to the compressed air compressed by the compressor and ignites it with a burner to generate high-temperature high-pressure combustion gas.

A plurality of turbine vanes and turbine blades are disposed alternately in a housing of the turbine. Further, a rotor penetrating a center of the compressor, combustor, turbine and an exhaust is also provided therein.

Both ends of the rotor are rotatably supported by bearings. A plurality of disks are fixed to the rotor and the blades are connected to the rotor. Simultaneously, a drive shaft of, e.g., a generator is connected to an end of an exhaust chamber or in front of the compressor.

Since the gas turbine does not have a reciprocating mechanism such as a piston of a four-stroke engine, consumption of lubricating oil is extremely low due to the absence of a mutual friction part such as a piston-cylinder. The gas turbine is also advantageous in that the amplitude, which is a characteristic of reciprocating machines, is greatly reduced, thereby permitting high-speed rotational motion.

The thermodynamic cycle of a gas turbine ideally follows a Brayton cycle. The Brayton cycle consists of four phases including isentropic compression (adiabatic compression), static pressure heating, isentropic expansion (adiabatic expansion), and static pressure heat discharge. After sucking the atmospheric air and compressing it to a high-pressure, a fuel is combusted in a static pressure environment to release heat energy. A high-temperature combustion gas is then expanded and transformed into kinetic energy, and an exhaust gas containing residual energy is discharged into the atmosphere. Likewise, the Brayton cycle consists of four processes, i.e., compression, heating, expansion, and heat discharge.

The operation of the gas turbine is briefly described. Air compressed in the compressor is mixed with the fuel and combusted to generate high-temperature combustion gas, and the combustion gas generated is injected into the turbine blades and vane. The injected combustion gas passes through the turbine vanes and blades and generates rotational force in the turbine blades, which eventually rotates the rotor coupled to the turbine blades.

The combustion gas with a high-pressure and high-temperature burned inside the combustion liner is transferred to the turbine through the transition piece. In order to maintain or improve gas turbine efficiency and emissions, it is important to prevent the high-pressure compressed air from leaking through the gap between the combustion liner and the transition piece into the combustion region.

SUMMARY

The present disclosure provides a combustor of a gas turbine including a combustion liner where combustion occurs, a transition piece connected to the combustion liner to allow combustion gases to pass through, and a honeycomb seal ring disposed between the combustion liner and the transition piece to prevent compressed air from leaking through a gap between the combustion liner and the transition piece. The honeycomb seal ring is inserted onto the exit portion of the combustion liner that is mated to the transition piece to prevent pressurized combustion gases from leaking when the combustion liner and the transition piece are coupled with each other. Here, the combustion liner further includes a combustion liner body and an exit portion connected to the combustion liner body and to which the transition piece is coupled.

In addition, the honeycomb seal ring may include honeycomb seal segments made of a metal alloy, a backing plate providing installation space for the honeycomb seal segments and on which the honeycomb seal segments are mounted, and a holding ring having a cylinder shape and allowing the backing plate to be installed therein.

The backing plate has a bended shape in a lateral elevation view, and the honeycomb seal segments are installed on a concave surface of the backing plate.

The holding ring has groove portions at opposite ends thereof along an axial direction of the holding ring to allow the backing plate having the honeycomb seal segments to be inserted into the holding ring.

Accordingly, the holding ring according to an embodiment of the present invention may accommodate a plurality of backing plates having the honeycomb seal segments installed thereon.

The honeycomb seal ring and the exit portion may be detachably coupled to each other, and the honeycomb seal segments have different heights in a portion as compared with other portions thereof. The honeycomb seal segments are preferably made of metal alloys, such as H-214 alloy, Hast-X alloy, or L-605 alloy.

According to an embodiment of the present invention, the honeycomb seal ring may be inserted into the transition piece, instead of the exit portion of the combustion liner, to prevent high-pressure compressed air from leaking through a gap between the combustion liner and the transition piece when they are coupled to each other.

In this case, the honeycomb seal segments are installed on a concave surface of the backing plate that has a bended shape in a lateral elevation view.

BRIEF DESCRIPTION OF THE DRAWINGS

These and/or other aspects, features, and advantages of the present disclosure will become apparent and more readily appreciated from the following description of exemplary embodiments, taken in conjunction with the accompanying drawings of which.

DETAILED DESCRIPTION OF THE DISCLOSURE

Figure 1:
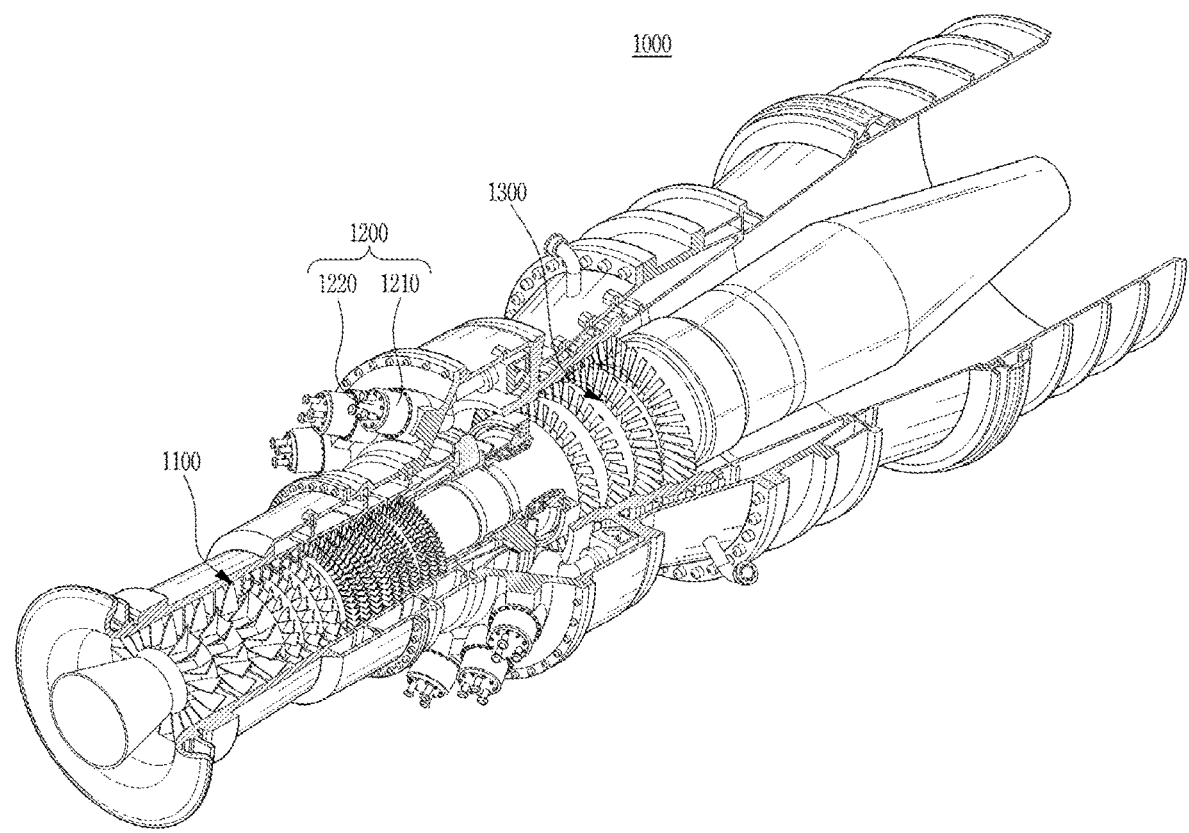
FIG. 1 is a view illustrating an overall structure of a gas turbine according to an embodiment of the present invention.

Hereinafter, exemplary embodiments will be described in greater detail with reference to the accompanying drawings. Regarding the reference numerals assigned to the elements in the drawings, it should be noted that the same elements will be specified by the same reference numerals, wherever possible, even though they are shown in different drawings. Also, in the description of exemplary embodiments, detailed description of well-known related structures or functions will be omitted when it is deemed that such description will cause ambiguous interpretation of the present disclosure.

It should be understood, however, that there is no intent to limit this disclosure to the particular exemplary embodiments disclosed. On the contrary, exemplary embodiments are to cover all modifications, equivalents, and alternatives falling within the scope of the exemplary embodiments. Like numbers refer to like elements throughout the description of the figures.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In addition, terms such as first, second, A, B, (a), (b), and the like may be used herein to describe components. Each of these terminologies are not used to define an essence, order or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, exemplary embodiments will be described in detail with reference to the accompanying drawings. The configuration and effects thereof can be clearly understood from the following description.

Figure 2:
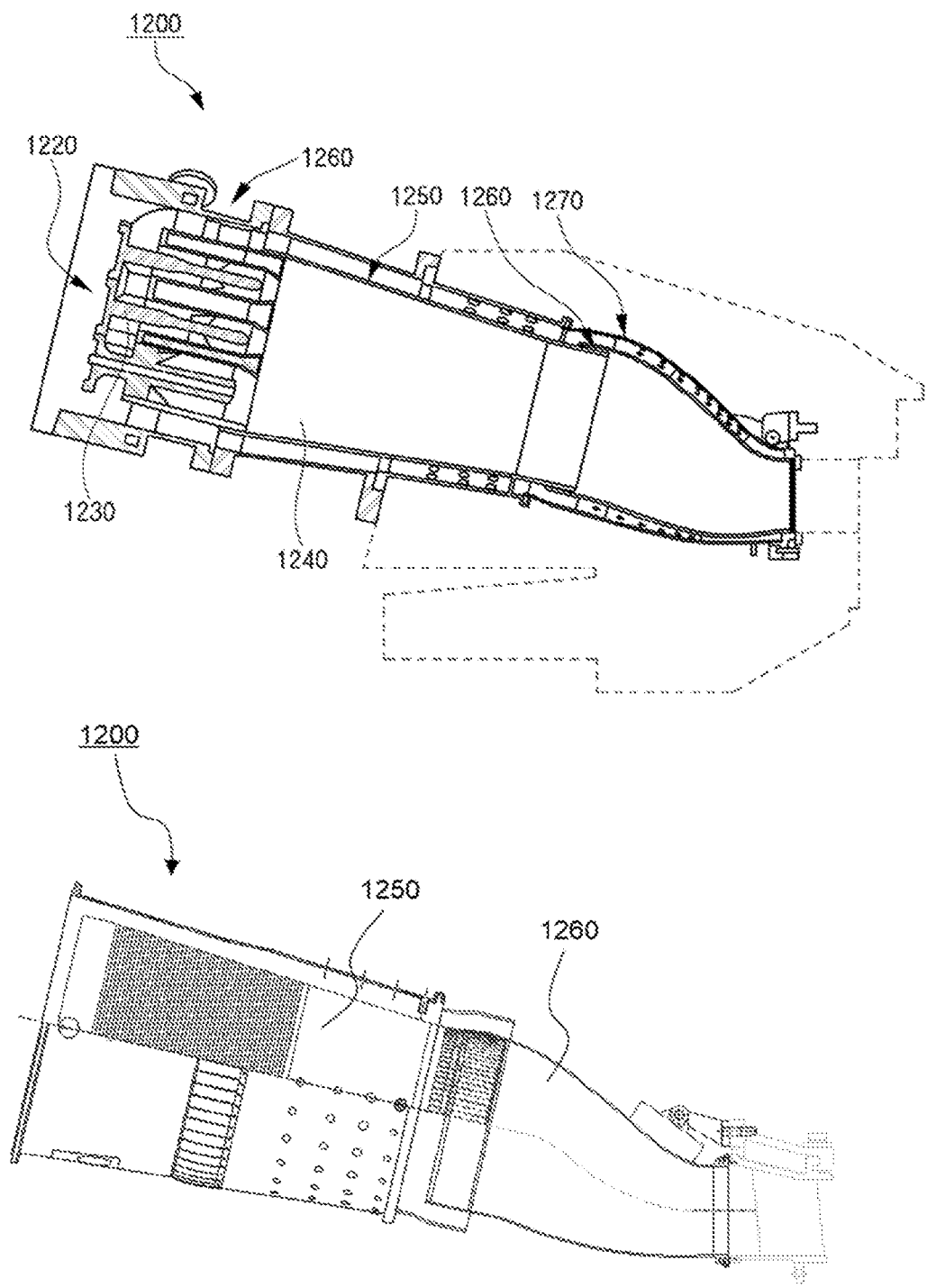
FIG. 2 is a view illustrating a combustor of a gas turbine according to an embodiment of the present invention.
Figure 3:
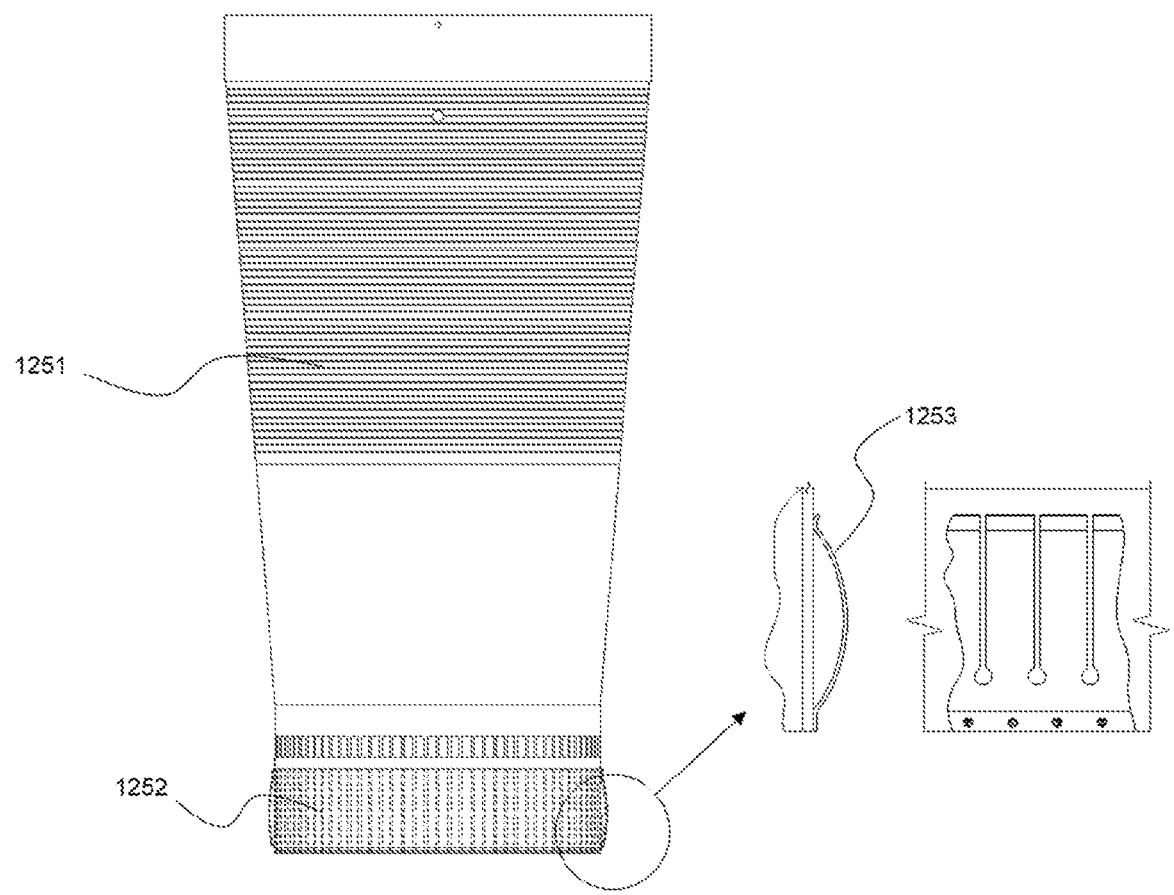
FIG. 3 is a view illustrating a combustion liner with a spring clip.
Figure 4:
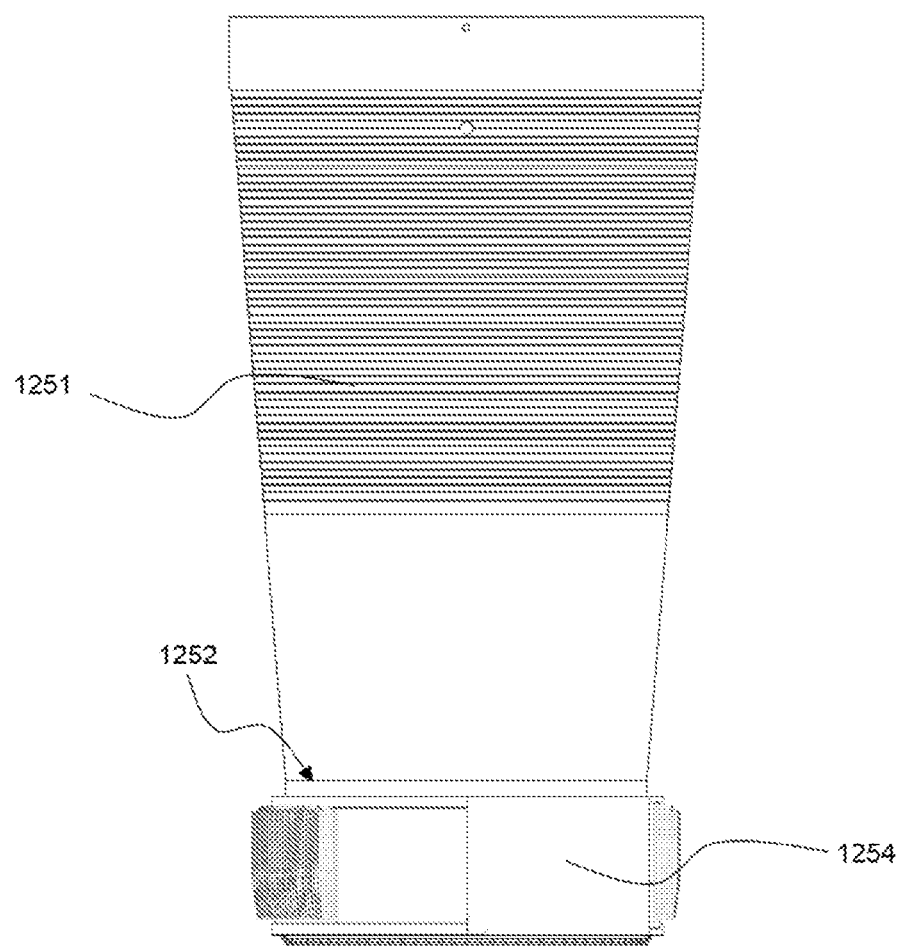
FIG. 4 is a view illustrating a combustion liner having a honeycomb seal ring according to an embodiment of the present invention.

FIG. 1 is a view schematically illustrating the overall configuration of a gas turbine 1000, and FIG. 2 illustrates an example of a combustor 1200. FIGS. 3 and 4 are views illustrating a combustion liner with a spring clip and a honeycomb seal ring, respectively, according to an embodiment of the present invention.

A gas turbine 1000 that realizes a Brayton cycle includes a compressor, a combustor, and a turbine 1300. FIG. 1 is a view schematically illustrating the overall configuration of a gas turbine 1000. Although the following description is based on the exemplary gas turbine of FIG. 1, it is not limited to the gas turbine 1000 as illustrated in FIG. 1 but may be applied to other gas turbine engines having equivalent configurations.

The compressor 1100 serves to compress air. The compressor 1100 supplies air that has been compressed to the combustor 1200 while also supplying the compressed air to a high-temperature region of the gas turbine 1000 to cool the high-temperature region in the gas turbine 1000. Since the air entering the compressor is subject to an adiabatic compression process in the compressor, the pressure and temperature of the air passing through the compressor 1100 are increased.

The compressor 1100 included in the gas turbine 1000 is usually designed as an axial compressor 1100 or centrifugal compressor design. In general, the centrifugal compressor 1100 is applied in a small gas turbine 1000, whereas a multi-stage axial compressor 1100 is used for a large gas turbine 1000, such as the gas turbine 1000 as shown in FIG. 1, due to a large amount of air compression. Referring to FIG. 1, a rotating shaft of a compressor 1100 and a rotating shaft of a turbine 1300 are connected to each other because the compressor 1100 is driven by using a portion of power output from the turbine 1300.

To this end, a rotary shaft of the compressor 1100 and a rotary shaft of the turbine 1300 are directly coupled to each other. In the case of the large gas turbine 1000, approximately half of the power produced by the turbine 1300 is consumed to drive the compressor. Therefore, the improvement in the efficiency of the compressor 1100 has a great influence on the overall efficiency of the gas turbine 1000.

The combustor 1200 mixes the compressed air supplied from an exit of the compressor 1100 with the fuel and combusts the mixture at a constant pressure to produce a high energy combustion gas. FIG. 2 illustrates the exemplary combustor 1200. The combustor 1200 is disposed downstream of the compressor, and a plurality of burners 1220 are disposed along an annular casing 1210 of the combustor. Each burner 1220 is provided with a single or several combustion nozzles 1230 and fuels injected from the combustion nozzles 1230 are mixed with the air at a predetermined ratio to make the mixture suitable for combustion.

Gas fuels and liquid fuels, or composite fuels or combination thereof may be used in the gas turbine 1000. It is important to create a combustion environment that reduces the amount of generated emissions containing carbon monoxide or nitrogen oxide, which are subject to regulatory restrictions. Accordingly, in recent years, a premix combustion is commonly applied because it can reduce the exhaust gas by lowering the combustion temperature and creating uniform combustion, even though the combustion control is relatively difficult. In the case of the premix combustion, the compressed air is mixed with the fuel injected from the combustion nozzle(s) 1230, and then enters a combustion chamber 1240. The initial ignition of the premixed gas is made using an igniter. When the combustion is stabilized after the ignition, the combustion is maintained by supplying the fuel and air.

Due to the a high-temperature environment in the combustor 1200, it is necessary to adequately cool the combustor 1200, which may be achieved by allowing the compressed air to flow along an outer surface of a duct assembly along with connecting a burner 1220 and a turbine 1300, through which a high-temperature combustion gas flows along with the application of specialty coatings or combination thereof. The duct assembly according to an embodiment of the present invention may include a combustion liner 1250, a transition piece 1260, and a flow sleeve 1270. The compressed air may be driven toward the combustion nozzle 1230. In this process, the duct assembly heated by the high-temperature combustion gas can be properly cooled.

The duct assembly according to an embodiment of the present invention may include a dual structure in which the flow sleeve 1270 surrounds an outer surface of the liner 1250 and transition piece 1260, which are coupled through an elastic support means 1280. The compressed air penetrates into the annular space inside the flow sleeve 1270 to thus cool the liner 1250 and transition piece 1260.

Here, since an end of the liner 1250 and the transition piece 1260 is secured to the combustor 1200 and the turbine 1300, respectively, the elastic support means 1280 has to be capable of supporting the liner 1250 and transition piece 1260 in a structure capable of accommodating a length and diameter elongation due to thermal expansion.

A high-temperature combustion gas produced in the combustor 1200 is supplied to the turbine 1300 through the duct assembly. In the turbine 1300, the thermal energy of the combustion gas is transformed into mechanical energy to rotate the rotating shaft by applying the collision and reaction force to a plurality of blades radially disposed on the rotary shaft of the turbine 1300, resulting from the adiabatic expansion of the combustion gas. Some of the mechanical energy obtained from the turbine 1300 is supplied as the energy required to compress the air in the compressor, while the remainder is used as effective energy such as producing electric power by driving a generator or mechanical device.

As such, the major components of the gas turbine 1000 do not reciprocate. In addition, the gas turbine rarely consumes lubricating oil due to the absence of a mutual friction part, such as a piston-cylinder. Further, the gas turbine 1000 is advantageous in that the amplitude, which is an intrinsic characteristic of reciprocating machines, is greatly reduced, thereby making a high-speed motion possible.

The combustion gas with a high-temperature burned inside the combustion liner 1250 is transferred to the turbine 1300 through the transition piece 1260. In order to maintain or improve gas turbine efficiency and emissions, it is important to prevent the high-pressure compressed air from leaking through the gap between the combustion liner 1250 and the transition piece 1260.

FIG. 3 shows a combustion liner 1250. As shown in FIG. 3, the combustion liner may include a combustion liner body 1251 where combustion occurs, and an exit portion 1252 located a bottom of the liner body and to which a transition piece 1260 is coupled. In the case of the conventional combustion liner 1250, upon connection of the combustion liner 1250 and the transition piece 1260, a spring clip 1253 may be provided to suppress the leakage of the compressed high-pressure compressor air through the gap between the combustion liner 1250 and the transition piece 1260.

FIG. 4 shows a combustion liner 1250 according to an embodiment of the present invention. As shown in FIG. 4, the combustion liner 1250 may include a combustion liner body 1251 where combustion occurs, and an exit portion 1252 located at a bottom of the liner body and to which a transition piece 1260 is coupled. The combustion liner 1250 may further include a honeycomb seal ring 1254 disposed in the exit portion 1252 of the liner and to prevent high-pressure compressed air from leaking through the gap between the combustion liner 1250 and the transition when the combustion liner 1250 and the transition piece 1260 are coupled with each other.

Figure 5:
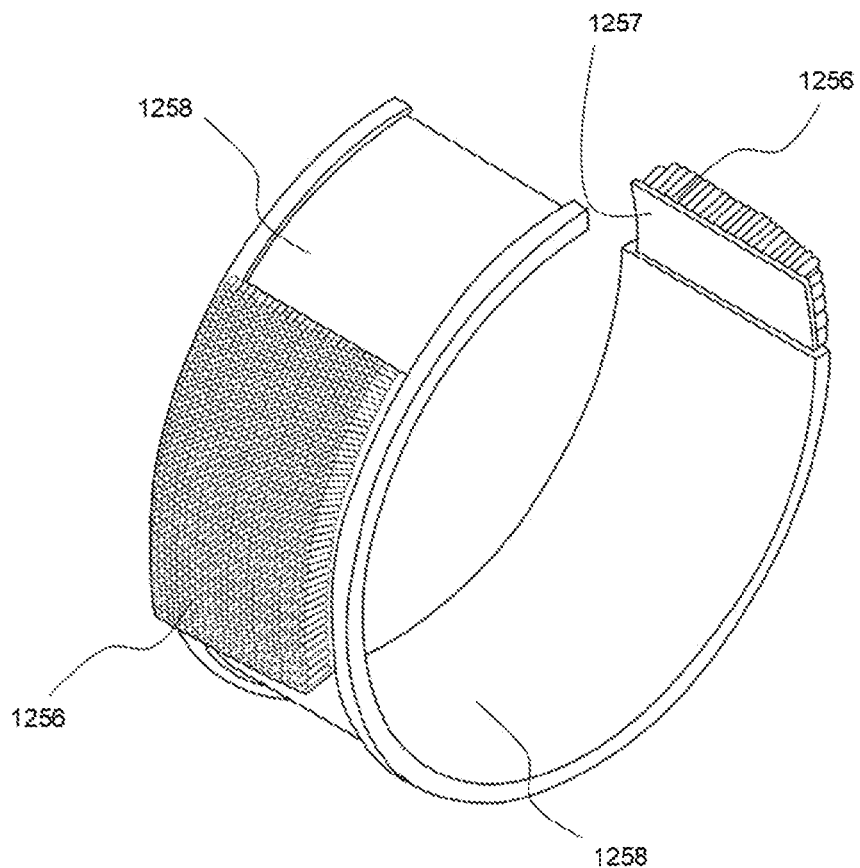
FIG. 5 is a view illustrating a honeycomb seal ring including honeycomb seal segments, a backing plate and a holding ring according to an embodiment of the present invention.
Figure 5:
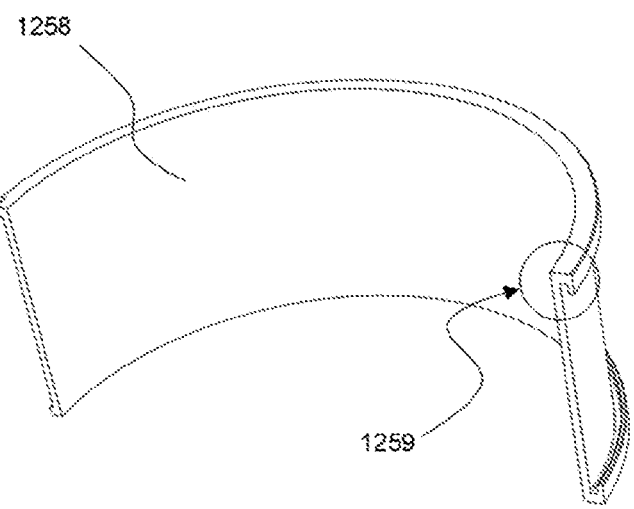

The honeycomb seal ring 1254 as illustrated in FIG. 5 may further include honeycomb seal segments 1256 made of a metal alloy, a backing plate 1257 providing installation space for the honeycomb seal segments 1256 and on which the honeycomb seal segments 1256 are mounted, and a holding ring 1258 in which an assembly of the honeycomb seal segments 1256 and the backing plate 1257 is detachably fitted.

Preferably, the holding ring 1258 may be formed in a cylinder shape so as to be coupled to the exit portion 1252 of the liner. Preferably, the holding ring 1258 may be provided with a groove portion 1259 on opposite sides of the holding ring 1258 along an axial direction of the cylindrical shape, allowing the assembly of the honeycomb seal segments 1256 and the backing plate 1257 to be inserted thereto.

FIG. 5 shows the "⊏" shaped groove portion 1259 spaced and placed on both sides along an axial direction of the holding ring 1258 in a cylinder shape. However, the groove portion 1259 of the holding ring 1258 according to an embodiment of the present invention is not limited to the shape shown in the figure, and may be modified into other forms in which the assembly of the honeycomb seal segments 1256 and backing plate 1257 may be easily coupled and secured. For example, the groove portion 1259 may be changed into a curved groove shape and the backing plate 1257 may be mounted to an end of the curved groove. The groove portion can be variously modified into other structures that allow the backing plate 1257 to be mounted on the holding ring 1258.

The assembly of the honeycomb seal segments 1256 and the backing plate 1257 may be formed in a cylinder shape by forming the backing plate 1257 in a cylinder shape similar to the holding ring 1258. The honeycomb seal segments 1256 may be mounted on an outer circumferential surface of the cylindrical shaped backing plate 1257. The honeycomb seal ring 1254 may be formed by coupling the cylinder-shaped assembly of the honeycomb seal segments 1256 and the backing plate 1257 with the cylinder-shaped holding ring 1258.

Figure 6:
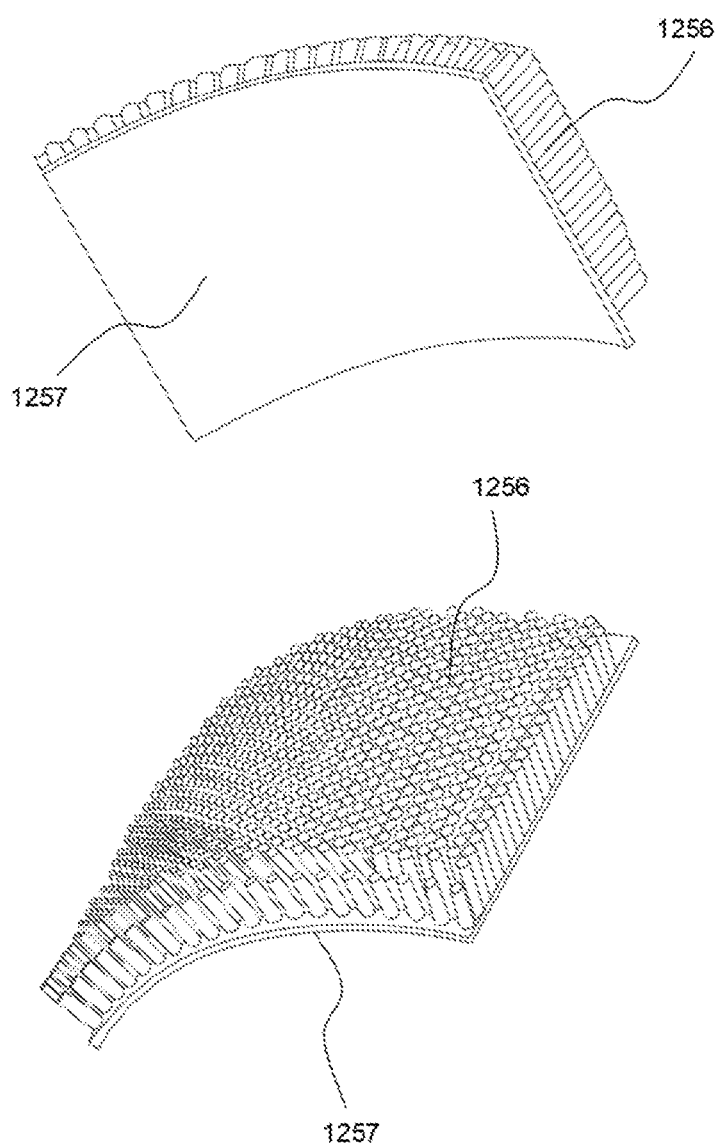
FIG. 6 is a view illustrating an assembly of honeycomb seal segments and a backing plate according to an embodiment of the present invention.

The assembly of the honeycomb seal segments 1256 and the backing plate 1257 according to an exemplary embodiment of the present invention is not limited to the cylinder-shaped ring form as described above. For example, two or more assemblies of the honeycomb seal segments 1256 and the backing plate 1257 may be inserted into the holding ring 1258 to make it easier to insert the assembly of the honeycomb seal segments 1256 and the backing plate 1257 into the holding ring 1258. FIG. 6 shows an exemplary assembly of the honeycomb seal segments 1256 and backing plate 1257 according to an embodiment of the present invention.

As shown in FIG. 6, the backing plate 1257 according to an embodiment of the present invention may have a rectangular shape in a top view and a curved arch shape in an elevation side view. In this case, the honeycomb seal segments 1256 can be installed on a convex surface portion of the backing plate 1257.

By forming segmented assemblies of the honeycomb seal segments 1256 and the backing plate 1257 as shown in FIG. 6, the honeycomb seal ring 1254 may be formed by slidingly inserting a plurality of assemblies of the honeycomb seal segments 1256 and the backing plate 1257 into the holding ring 1258. As shown FIG. 5, the assemblies of the honeycomb seal segments 1256 and the backing plate 1257 are inserted into the holding ring 1258, and the multiple assemblies of the honeycomb seal segments 1256 and the backing plate 1257 inserted into the portion of the holding ring 1258 circumferentially surround the entire holding ring 1258.

The honeycomb seal ring 1254 formed using a plurality of assemblies of the honeycomb seal segments 1256 and the backing plate 1257 is advantageous in terms of maintenance. According to an embodiment of the present invention, if the plurality of "assemblies of the honeycomb seal segments 1256 and the backing plate 1257" are inserted into the holding ring 1258 to form the honeycomb seal ring 1254, when the sealing efficiency of the compressed air is reduced due to breakage in a portion of the honeycomb seal segments 1256, it may be possible to replace the broken portions of the assembly of the honeycomb seal segments 1256 and the backing plate 1257, instead of replacing the entire assembly of the honeycomb seal segments 1256 and the backing plate 1257.

A plurality of honeycomb seal segments 1256 may be installed along the convex surface portion of the backing plate 1257. The honeycomb seal segments 1256 according to an embodiment of the present invention may have a predetermined pattern along a horizontal direction or a vertical direction. The honeycomb seal segments 1256 may be disposed in a line along an axial direction or a circumferential direction of the holding ring 1258, as shown in FIG. 6. The circumferential direction of the holding ring 1258 refers to a tangential direction of the cylinder-shaped holding ring 1258.

Figure 7:
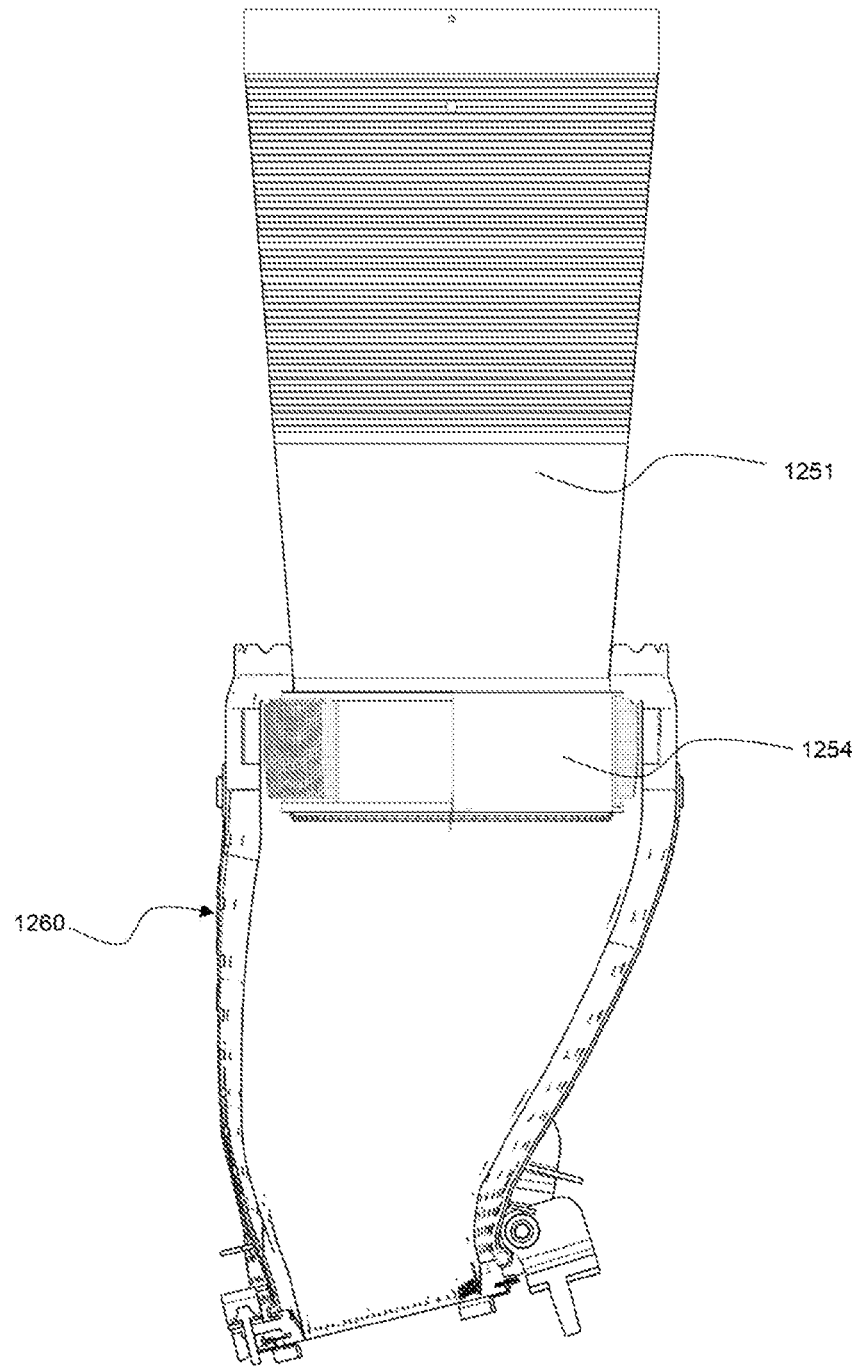
FIG. 7 is a cross-sectional view illustrating an assembly of a combustion liner and a transition piece with a honeycomb seal ring therebetween according to an embodiment of the present invention.

The arrangement of the honeycomb seal segments 1256 is not limited to a shape shown in the figure, but may be changed into various structures that suppress the leakage of compressed air through a coupled portion of the combustion liner 1250 and the transition piece 1260 when the honeycomb seal ring 1254 is mounted at the exit portion 1252 of the combustion liner 1250 and the transition piece 1260 is coupled to the exit portion 1252 of the liner while surrounding the honeycomb seal ring 1254. FIG. 7 is a cross-sectional view of the combustion liner 1250 and the transition piece 1260 coupled to each other with the honeycomb seal ring 1254 disposed therebetween.

It is possible to form the assembly of the combustion liner 1250 and the transition piece 1260 that minimizes the leakage of the compressed air by disposing the honeycomb seal ring 1254 between the combustion liner 1250 and the transition piece 1260. This is achieved by installing the honeycomb seal ring 1254 at an outer surface of the combustion liner 1250 to surround the same and then coupling the transition piece 1260 to the honeycomb seal ring 1254.

Figure 8:
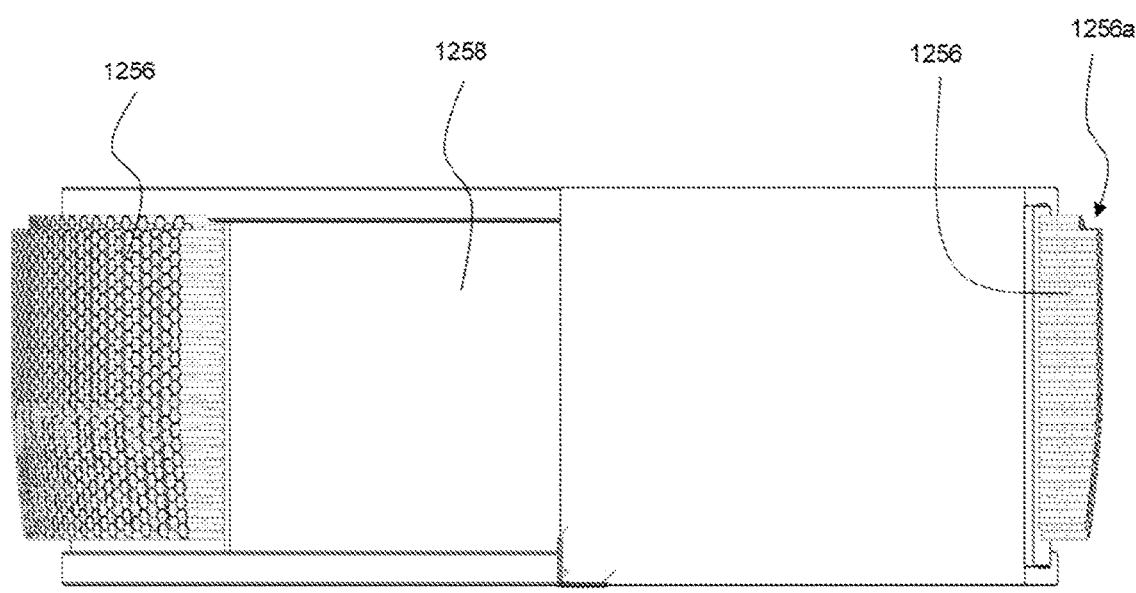
FIG. 8 is a view illustrating a honeycomb seal ring according to an embodiment of the present invention.

The honeycomb seal segments 1256 according to an embodiment of the present invention may be formed to have different heights to facilitate the coupling of the combustion liner 1250 and transition piece 1260. As shown in FIG. 8, some of the honeycomb seal segments 1256 may have a shorter height than other honeycomb seal segments 1256. According to an embodiment of the present invention, the honeycomb seal segments 1256 is mounted on the backing plate 1257, and then the assembly of the honeycomb seal segments 1256 and the backing plate 1257 is inserted into the holding ring 1258, thereby forming the honeycomb seal ring 1254. The honeycomb seal ring 1254 formed in such a manner may be mounted on the exit portion 1252 of the combustion liner 1250 and the transition piece 1260 is then coupled to the exit portion 1252 of the liner to surround the honeycomb seal ring 1254. Accordingly, it is possible to reduce the friction between the transition piece 1260 and the honeycomb seal ring 1254 and to facilitate them to be coupled to each other by varying heights of the honeycomb seal segments 1256 when the transition piece 1260 is coupled to the exit portion 1252 of the combustion liner 1250, i.e. the transition piece 1260 is coupled to surround the honeycomb seal segments 1256 of the honeycomb seal ring 1254.

For example, as shown in FIG. 8, a step portion 1256a may be formed in an end portion of the honeycomb seal segments 1256, in which the honeycomb seal segments 1256 are shorter than other segments 1256.

Alternatively, the honeycomb seal segments 1256 included in the honeycomb seal ring 1254 according to an embodiment of the present invention may be configured such that the height thereof changes gradually. This is to facilitate the coupling of the honeycomb seal segments 1256 with the transition piece 1260 while suppressing the leakage of the compressed air, as described above.

Materials for the honeycomb seal segments 1256 have to withstand high temperatures and oxidation. Nickel alloys with trade names such as Hastalloy X, AMS 5536 or H-214 are typically used for the honeycomb seal segments 1256. The honeycomb seal segments 1256 are attached to the backing plate 1257 via a nickel braze, and thus the backing plate 1257 may be formed from similar or same alloys as the honeycomb seal segments 1256. The holding ring 1258 also has to withstand the high temperature and oxidation, and accordingly, nickel alloys with trade names such as Hastalloy X, Nimonic 263, IN-625, H-230, AMS 5536, AMS 5872, AMS 5599 or AMS 5878 are typical choices even though H-230 may be the preferred one. However, materials of the honeycomb seal segments 1256 are not limited thereto and may be formed of various materials to meet the purpose.

The honeycomb seal ring 1254 according to an embodiment of the present invention is not limited to being coupled to the exit portion 1252 of the combustion liner 1250. According to another embodiment of the present invention, the honeycomb seal ring 1254 may be mounted on an inner wall of the transition piece 1260. For example, the honeycomb seal ring 1254 may be inserted into an interior of an inlet portion of the transition piece 1260, and then the exit portion 1252 of the combustion liner 1250 may be inserted into the inlet portion of the transition piece 1260 within which the honeycomb seal ring 1254 is mounted thereon, thereby preventing the compressed air from leaking into a gap between the combustion liner 1250 and the transition piece 1260.

In this case, when the backing plate 1257 has a curved arch shape when it is viewed from the side, the honeycomb seal segments 1256 may be preferably installed in the concave surface of the backing plate 1257. Further, the honeycomb seal segments 1256 may have different heights or may be configured to vary in height such that the exit portion 1252 of the combustion liner 1250 may be easily inserted into the interior of an inlet portion of the transition piece 1260 having the honeycomb seal ring 1254 therein.

Although the combustion liner chamber has been described in detail above through a few exemplary embodiments, the present disclosure is not limited thereto and should be construed as having the widest range according to the basic spirit disclosed herein. Those skilled in the art may implement a pattern of a form not stated above by combing or replacing the disclosed exemplary embodiments, which should also be construed as within the scope of the present disclosure. Further, it will be apparent to those skilled in the art that various modifications and variation can be easily made to these exemplary embodiments without departing from the spirit or scope of the claims.

What is claimed is:

1. A combustor of a gas turbine, the combustor comprising:
    a combustion liner where combustion occurs, the combustion liner including a combustion liner body and an exit portion connected to the combustion liner body;
    a transition piece connected to the exit portion of the combustion liner; and
    a honeycomb seal ring disposed between the combustion liner and the transition piece to prevent compressed air from leaking through a gap between the combustion liner and the transition piece,
    wherein the combustion liner and the transition piece are configured to be coupled with each other by inserting the exit portion of the combustion liner into the honeycomb seal ring, and
    wherein the honeycomb seal ring comprises:
        a holding ring having a cylinder shape;
        honeycomb seal segments made of a metal alloy; and
        a backing plate on which the honeycomb seal segments are mounted, the backing plate configured to be installed in the holding ring.

2. The combustor of claim 1,
    wherein the backing plate includes a plurality of backing plates each having a concave surface formed in an arch shape, and
    wherein the honeycomb seal segments are mounted on the concave surface of each of the plurality of backing plates to form a plurality of assemblies, respectively, each assembly of the plurality of assemblies including the honeycomb seal segments and a corresponding backing plate of the plurality of backing plates.

3. The combustor of claim 1, wherein the holding ring includes a first axial end and a second axial end disposed opposite to the first end, each of the first and second axial ends including a groove portion to receive the backing plate inserted in a circumferential direction of the holding ring.

4. The combustor of claim 1, wherein a height of the honeycomb seal segments in a portion is different from a height of the honeycomb seal segments in another portion.

5. The combustor of claim 1, wherein the metal alloy of the honeycomb seal segments is a nickel alloy.

6. A combustor of a gas turbine, the combustor comprising:
    a combustion liner where combustion occurs, the combustion liner including a combustion liner body and an exit portion connected to the combustion liner body;
    a transition piece connected to the exit portion of the combustion liner; and
    a honeycomb seal ring disposed between the combustion liner and the transition piece to prevent compressed air from leaking through a gap between the combustion liner and the transition piece,
    wherein the combustion liner and the transition piece are configured to be coupled with each other by inserting the honeycomb seal ring into the transition piece, and
    wherein the honeycomb seal ring comprises:
        a holding ring having a cylinder shape;
        honeycomb seal segments made of a metal alloy; and
        a backing plate on which the honeycomb seal segments are mounted, the backing plate configured to be installed in the holding ring.

7. The combustor of claim 6,
    wherein the backing plate backing plate includes a plurality of backing plates each having a concave surface formed in an arch shape, and
    wherein the honeycomb seal segments are mounted on the concave surface of each of the plurality of backing plates to form a plurality of assemblies, respectively, each assembly of the plurality of assemblies including the honeycomb seal segments and a corresponding backing plate of the plurality of backing plates.

8. The combustor of claim 6, wherein the holding ring includes a first axial end and a second axial end disposed opposite to the first end, each of the first and second axial ends including a groove portion to receive the backing plate inserted in a circumferential direction of the holding ring.

9. The combustor of claim 6, wherein a height of the honeycomb seal segments in a portion is different from a height of the honeycomb seal segments in another portion.

10. The combustor of claim 6, wherein the metal alloy of the honeycomb seal segments is a nickel alloy.

11. A gas turbine for generating power, comprising:
    a compressor compressing air to form compressed air;
    a combustor disposed downstream of the compressor, mixing the compressed air supplied from the compressor with fuel, and combusting the mixture at a constant pressure to produce a combustion gas;
    a turbine to which the combustion gas is supplied; and
    a rotating shaft connected to the compressor and the turbine to deliver rotation power generated in the turbine to the compressor, resulting in rotation of the compressor,
    wherein the combustor comprises:
        a combustion liner where combustion occurs, the combustion liner including a combustion liner body and an exit portion connected to the combustion liner body;
        a transition piece connected to the exit portion of the combustion liner; and
        a honeycomb seal ring disposed between the combustion liner and the transition piece to prevent the combustion gas from leaking through a gap between the combustion liner and the transition piece,
        wherein the combustion liner and the transition piece are configured to be coupled with each other by inserting the exit portion of the combustion liner into the honeycomb seal ring, and
        wherein the honeycomb seal ring comprises:

a holding ring having a cylinder shape;
honeycomb seal segments made of a metal alloy; and
a backing plate on which the honeycomb seal segments are mounted, the backing plate configured to be installed in the holding ring.

12. The gas turbine of claim 11,
wherein the backing plate includes a plurality of backing plates each having a concave surface formed in an arch shape, and
wherein the honeycomb seal segments are mounted on the concave surface of each of the plurality of backing plates to form a plurality of assemblies, respectively, each assembly of the plurality of assemblies including the honeycomb seal segments and a corresponding backing plate of the plurality of backing plates.

13. The gas turbine of claim 11, wherein the holding ring includes a first axial end and a second axial end disposed opposite to the first end, each of the first and second axial ends including a groove portion to receive the backing plate inserted in a circumferential direction of the holding ring.

14. The gas turbine of claim 11, wherein a height of the honeycomb seal segments in a portion is different from a height of the honeycomb seal segments in another portion.

15. The gas turbine of claim 11, wherein the metal alloy of the honeycomb seal segments is a nickel alloy.

* * * * *